United States Patent [19]

Matsuyama

[11] Patent Number: 5,054,944
[45] Date of Patent: Oct. 8, 1991

[54] SERIAL PRINTER HAVING A CARRIER CABLE CONNECTED TO A MOVABLE PRINT HEAD

[75] Inventor: Yukio Matsuyama, Tokyo, Japan

[73] Assignee: NEC Corporation, Tokyo, Japan

[21] Appl. No.: 543,511

[22] Filed: Jun. 26, 1990

[30] Foreign Application Priority Data

Jun. 26, 1989 [JP] Japan .................... 1-747799[U]

[51] Int. Cl.⁵ .......................................... B41J 29/00
[52] U.S. Cl. .................... 400/679; 400/719; 400/124; 400/320; 174/69
[58] Field of Search ............ 400/320, 335, 352, 719, 400/679, 319, 320.1, 124; 174/69; 360/106

[56] References Cited

U.S. PATENT DOCUMENTS

| | | | |
|---|---|---|---|
| 3,509,980 | 5/1970 | Loughry et al. | 400/120 |
| 3,819,028 | 6/1974 | Drillick | 400/320 X |
| 3,987,882 | 10/1976 | Kobryn | 400/320 |
| 4,613,246 | 9/1986 | Sugiura et al. | 400/320 |
| 4,746,766 | 5/1988 | Soulard | 400/320 X |
| 4,775,868 | 10/1988 | Sugiura | 400/120 X |
| 4,898,351 | 2/1990 | Suzuki | 400/120 X |
| 4,902,150 | 2/1990 | Imai et al. | 400/320 |

FOREIGN PATENT DOCUMENTS 0236782 11/1985 Japan .................... 400/679

Primary Examiner—Edgar S. Burr
Assistant Examiner—Christopher A. Bennett
Attorney, Agent, or Firm—Sughrue, Mion, Zinn Macpeak & Seas

[57] ABSTRACT

A serial printer includes a print head movable along a print line of a recording sheet. A flexible carrier cable is attached to the print head for supplying a drive signal thereto. One end of the carrier cable is fixed to the movable print head, but its longitudinally intermediate portion is free, and bent to form a C-shape which follows the movement of the print head. The carrier cable includes a magnetic material, and a magnetic plate is provided at a position opposing the lower part of the C-shaped carrier cable to attract and hold the lower part of the carrier cable, whereby the vibration caused in the carrier cable by the movement of the print head is reduced.

5 Claims, 3 Drawing Sheets

SERIAL PRINTER HAVING A CARRIER CABLE CONNECTED TO A MOVABLE PRINT HEAD

BACKGROUND OF THE INVENTION

The present invention relates to a serial printer in which a print head is laterally and reciprocally driven along a print line of a recording sheet, so as to serially print characters onto the print line.

A serial printer includes a print head mounted on a carrier member in order to be laterally and reciprocally driven over a range substantially the same as the length of a print line. The print head serially prints characters onto the print line during the lateral and reciprocal movement in response to print head drive signals corresponding to character patterns of the characters to be printed.

To supply a drive signal to the print head, the print head is connected to a flexible cable, named carrier cable, which has a length long enough to permit movement of the print head over the entire length of the print line. The carrier cable is fixed to the print head at one end and to an appropriate portion of a frame of the printer at its other end. The intermediate portion between the fixed ends is not securely fixed to the printer frame and therefore follows the movement of the print head.

As the print head is driven laterally the intermediate portion of the carrier cable can suffer severe flexing and vibration. As a result, the carrier cable may suffer fatigue and break.

In a conventional serial printer, in an effort to prevent cable breakage, a flexible, thin metal plate is adhered to a surface of the carrier cable to supplement the strength of the carrier cable. However, the thin metal plate does not sufficiently strengthen the carrier cable against the complicated forces generated during sudden cable movement, such as occurs during sudden acceleration or deceleration of the print head. Additionally, the metal plate is very expensive, and it requires time and energy consuming process steps to assemble the carrier cable and the metal plate.

SUMMARY OF THE INVENTION

Therefore, an object of the present invention is to provide a serial printer capable of reducing fatigue or damage to a carrier cable connected to a movable print head.

Another object of the present invention is to provide a simple structure in a serial printer for preventing carrier cable breakage.

A serial printer according to the present invention comprises a print head movably supported in a head moving direction; means for driving the print head in the head moving direction; a flexible cable having first and second ends for supplying a signal to the print head, the first end being connected to the print head, the flexible cable being suspended from the first end to form a C-shaped configuration including a bend in its nonfixed intermediate portion between the first and second ends, and elongated substantially parallel to the head moving direction to follow the movement of the print head, the flexible cable including a magnetic material provided over its length; and a magnetic plate provided at a position opposing a portion of said flexible cable from the bend to the second end.

DETAILED DESCRIPTION OF THE PREFERRED EMBODIMENT

Figure 1:
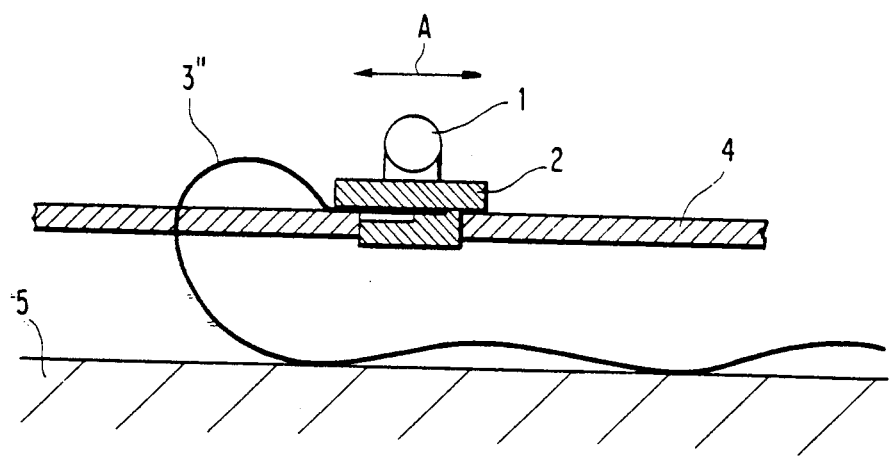
FIG. 1 is a front view schematically showing a conventional serial printer.

To clarify the structural features of the present invention, a description will first be made of a conventional serial printer, with reference to FIG. 1.

A print head 1 is mounted on a carrier 2 which is slidably supported by a guide shaft 4. The print head 1 is provided with a plurality of print elements. For example, if the print head 1 has a plurality of print wires for forming a character.

A flexible carrier cable 3'' includes a plurality of signal lines corresponding to the plurality of print elements. The carrier cable 3'' is connected to the print head 1 to supply drive signals to activate print elements selected from the plurality of the print elements. One end of the carrier cable 3'' is fixed to the carrier 2 and the other end is fixed to a suitable portion (not shown) of frame 5. The intermediate portion between the two ends of the carrier cable 3'' is freely provided to permit the carrier 2 to move in the direction designated by arrow A.

In a printing operation, the carrier 2 is driven, guided by the shaft 4, to move in the directions of arrow A, while the carrier cable 3'' follows the movement of the carrier 2. The intermediate portion of the carrier cable 3'' suffers an irregular bending force and irregular vibration force due to the movement of the carrier 2, especially when the carrier 2 is suddenly accelerated or decelerated. When the frequency of the vibration force equals the resonant frequency of the carrier cable 3'', the carrier cable 3'' experiences motion as shown in FIG. 1. This motion rapidly degrades the strength of the carrier cable.

Embodiments of the present invention will now be described.

Figure 2:
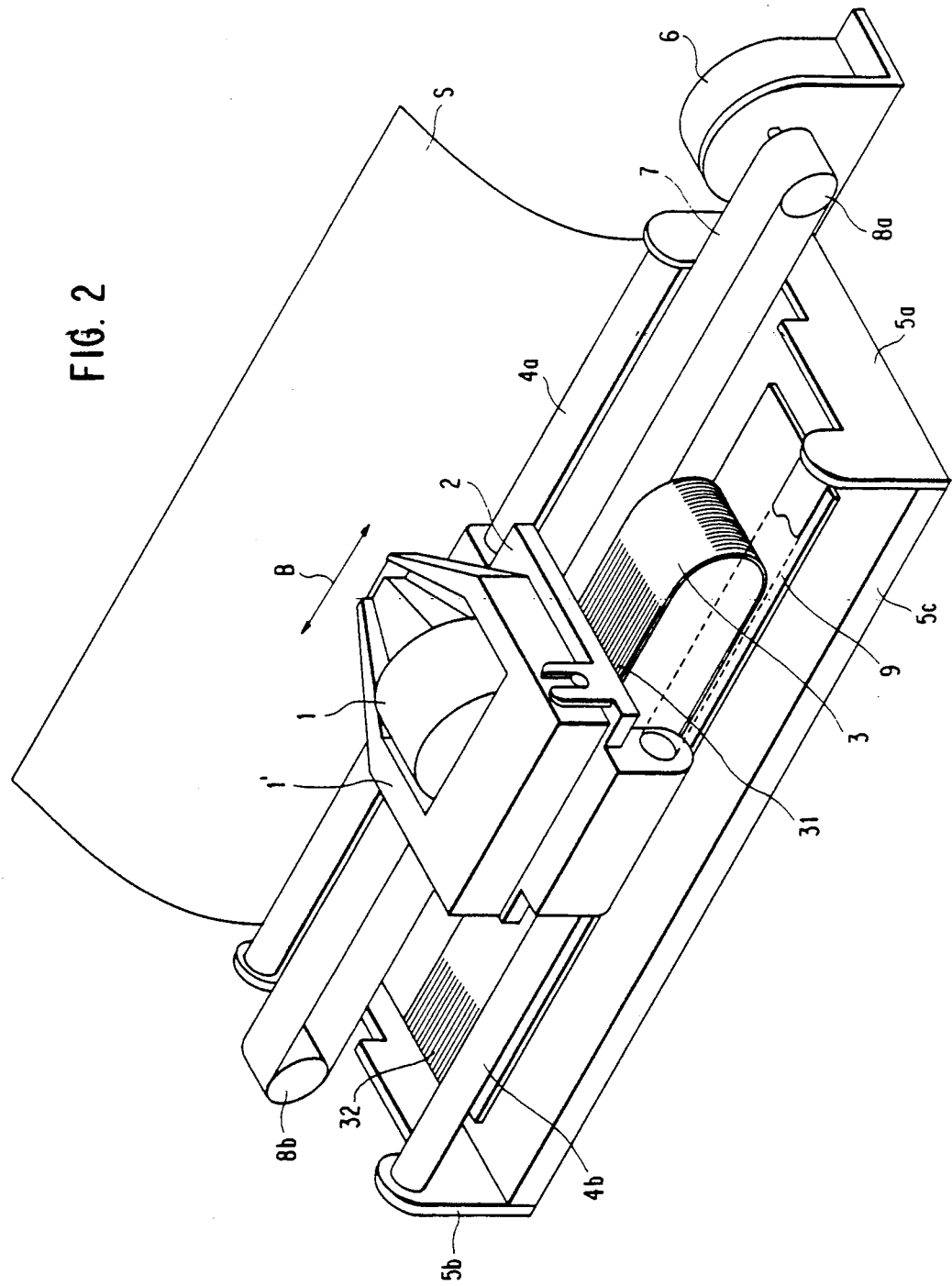
FIG. 2 is a perspective view showing an embodiment of the present invention.

Referring to FIG. 2, an embodiment of the present invention includes a print head 1 and an inked ribbon cartridge 1' mounted on a carrier 2. The carrier 2 is movably supported by a pair of guide shafts 4a and 4b. The guide shafts 4a and 4b are supported by side frames 5a and 5b which are integrally formed with a base frame 5c. A carrier drive motor 6 is provided for moving the carrier by means of a drive belt 7 which engages a driven pulley 8a and a drive pulley 8b and is fixed to the carrier 2 at its intermediate portion therebetween. Thus, the carrier is driven in the directions designated by arrow B between the side frames 5a and 5b by the drive motor 6 while the print head 1 prints characters on a recording sheet s.

A flexible carrier cable 3, for supplying a drive signal to the print head 1, is fixed to and suspended from the carrier 2 and connected to the print head 1 at its first end 31, and its second end 32 is fixed to the base frame 5c so as to be elongated parallel to the movement of the carrier 2. The intermediate portion of the cable 3 is bent into a C-shape. A lower part of the intermediate portion, from the bend in the cable to the second end 32 thereof lies on the base frame 5c. As the carrier 2 is driven in the directions B, the carrier cable 3 follows the carrier 2 causing the position of the bend in the cable to vary, as is well known in the art.

A magnetic plate 9 is provided on the base frame 5c at the position opposing the lower part of the carrier cable 3. Since the carrier cable 3 includes magnetic material, as described hereinafter, the lower part of the cable 3 is attracted to the magnetic plate 9.

Figure 3:
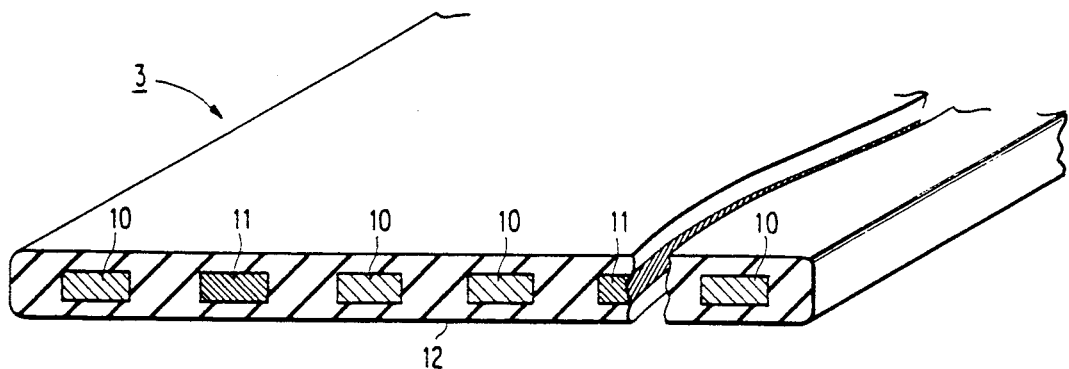
FIG. 3 shows an example of a carrier cable which can be used in the FIG. 2 embodiment of the present invention.

FIG. 3 shows one embodiment of the carrier cable 3 which includes a plurality of conductive signal lines 10 and a predetermined number of magnetic lines 11 provided parallel to each other. The conductive signal lines 10, made from soft copper, and the magnetic lines 11, made, for example, from iron or nickel alloy and being of the same size as the signal lines 10, are covered by an insulator 12 to form the carrier cable 3. The lines 10 and 11 may have a cross-sectional size of 35 μm×800 μm. The forming pitch of the lines 10 and 11 may be 0.05 inch.

Figure 4:
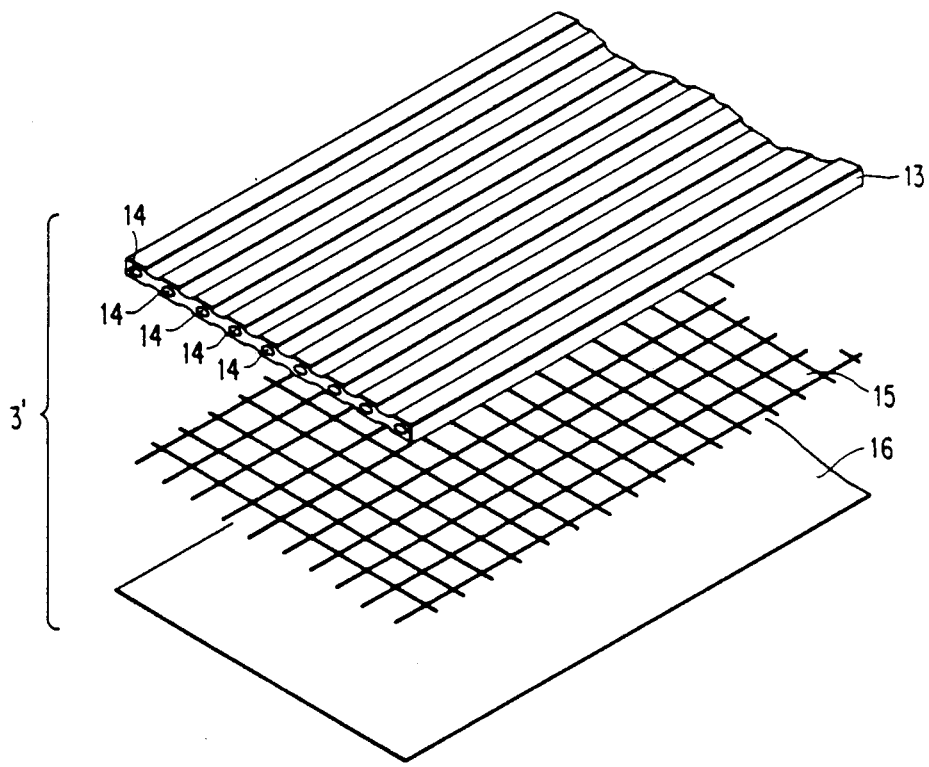
FIG. 4 shows another example of a carrier cable which can be used in the FIG. 2 embodiment of the present invention.

Another embodiment of a carrier cable 3' is shown in FIG. 4. The carrier cable 3' includes a conventional flexible cable 13 having a plurality of conductive signal lines 14 and a magnetic mesh 15 adhered to the cable 13 by an adhesive sheet 16.

Figure 5:
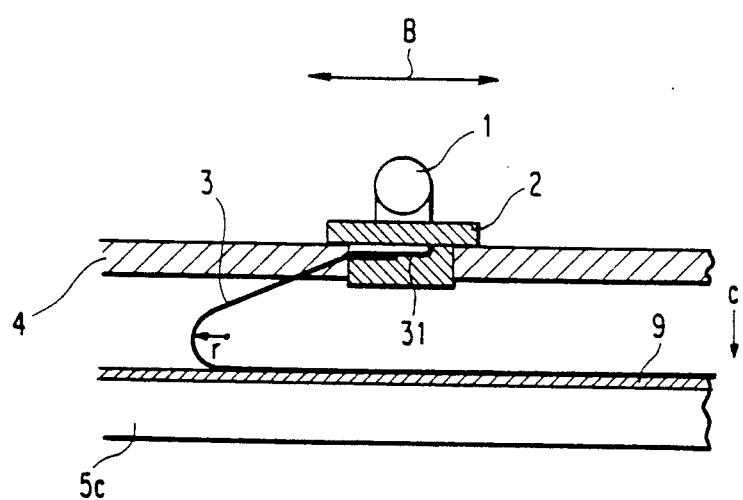
FIG. 5 is a front view schematically showing an operation of the embodiment of the present invention shown in FIG. 2.

Referring to FIG. 5, the magnetic plate 9 attracts and stably holds the lower part of the carrier cable 3 when the carrier 2 is driven in the directions B. The magnetic plate 9 has a magnetic force in a direction C of about 150 g/cm·inch so that the curvature radius r of the bend in the carrier cable is kept substantially constant since the moving force applied by the carrier 2 to the cable 3 is balanced by the attractive force of the magnetic plate 9. Preferably, the magnetic force of the magnetic plate 9 is so determined that the curvature radius r of the carrier cable 3 is greater than 10 mm. Since the magnetic plate 9 stably holds the lower part of the carrier cable 3, the irregular vibration of the cable 3 caused by the movement of the carrier 2 is prevented. Further, the stress to the cable 3 is decreased since the vibration caused by the resonance is also prevented. Therefore, the durability of the carrier cable 3 can be extended.

What is claimed is:

1. A serial printer comprising,
a print head movably supported in a head moving direction;
a flexible cable, having first and second ends and an intermediate portion between said first and second ends, for supplying a signal to said print head, said first end being connected to said print head, said flexible cable being suspended from said first end to form a C-shaped configuration including a bend in its non-fixed intermediate portion between said first and second ends, and elongated substantially parallel to said head moving direction to follow the movement of said print head, said flexible cable including a magnetic material extending in the longitudinal direction of said flexible cable; and
a magnetic plate provided at a position opposing said flexible cable to magnetically attract the portion of said flexible cable between said bend and said second end.

2. The serial printer as claimed in claim 1, wherein said flexible cable includes a plurality of conductive signal lines and at least one magnetic line parallel to said conductive signal lines.

3. The serial printer as claimed in claim 1, wherein said flexible cable includes a plurality of conductive signal lines parallel to each other to form a flat cable and a magnetic mesh attached to a surface of said flat cable.

4. The serial printer as claimed in claim 1, wherein said magnetic plate has a magnetic force causing a curvature radius of said bend in said flexible cable to be greater than 10 mm.

5. The serial printer as claimed in claim 1, wherein said magnetic plate has a magnetic force, in a direction perpendicular to said magnetic plate, of about 150 g/cm·inch.

* * * * *